United States Patent
Kim et al.

(10) Patent No.: US 7,618,599 B2
(45) Date of Patent: Nov. 17, 2009

(54) REACTION CHAMBER FOR MANUFACTURING A CARBON NANOTUBE, APPARATUS FOR MANUFACTURING THE CARBON NANOTUBE AND SYSTEM FOR MANUFACTURING THE CARBON NANOTUBE

(75) Inventors: Sung-Soo Kim, Yongin-si (KR); Jong-Kwan Jeon, Yongin-si (KR)

(73) Assignee: Semes Co., Ltd. (KR)

( * ) Notice: Subject to any disclaimer, the term of this patent is extended or adjusted under 35 U.S.C. 154(b) by 368 days.

(21) Appl. No.: 11/764,344

(22) Filed: Jun. 18, 2007

(65) Prior Publication Data

US 2008/0152554 A1 Jun. 26, 2008

(30) Foreign Application Priority Data

Dec. 21, 2006 (KR) .................... 10-2006-0131459

(51) Int. Cl.
*B01J 8/00* (2006.01)
*B01J 8/02* (2006.01)
*C23C 16/00* (2006.01)
*C01B 31/02* (2006.01)
*D01F 9/12* (2006.01)

(52) U.S. Cl. ................... 422/198; 422/211; 118/715; 423/445 R; 423/447.1; 423/447.3; 977/842; 977/843; 977/855

(58) Field of Classification Search ................ 422/198, 422/211; 118/715; 423/445 R, 447.1, 447.3; 977/842, 843, 855
See application file for complete search history.

(56) References Cited

U.S. PATENT DOCUMENTS

| | | | |
|---|---|---|---|
| 4,924,073 A * | 5/1990 | Chiba | 219/413 |
| 5,872,889 A * | 2/1999 | Kaltenbrunner et al. | 392/418 |
| 6,093,252 A * | 7/2000 | Wengert et al. | 118/719 |
| 6,113,702 A * | 9/2000 | Halpin et al. | 118/725 |
| 2004/0013419 A1 * | 1/2004 | Sakuma et al. | 392/411 |
| 2004/0192151 A1 * | 9/2004 | Tsukamoto et al. | 445/50 |
| 2005/0109275 A1 * | 5/2005 | Wood | 118/715 |
| 2006/0096531 A1 * | 5/2006 | Ishizaka et al. | 118/715 |
| 2006/0099136 A1 * | 5/2006 | Dillon et al. | 423/447.3 |
| 2007/0231246 A1 * | 10/2007 | Hwang et al. | 423/460 |
| 2008/0305031 A1 * | 12/2008 | Kim et al. | 423/447.7 |

* cited by examiner

*Primary Examiner*—Walter D Griffin
*Assistant Examiner*—Huy-Tram Nguyen
(74) *Attorney, Agent, or Firm*—Daly, Crowley, Mofford & Durkee, LLP

(57) ABSTRACT

Disclosed are a reaction chamber for manufacturing a carbon nanotube, an apparatus for manufacturing a carbon nanotube and a system for manufacturing a carbon nanotube. The reaction chamber includes a reaction furnace, a gas inlet, a gas outlet and a heat transfer member. The reaction furnace has a box structure for receiving a substrate wherein the reaction furnace provides a space for forming the carbon nanotube on the substrate. The gas inlet having a through-hole structure formed at a first portion of the reaction furnace and the gas outlet has a through-hole structure formed at a second portion of the reaction furnace. The heat transfer member has at least one rectangular through-hole structure formed at a third portion of the reaction furnace along a direction substantially in parallel to the substrate. The apparatus includes the reaction furnace, a gas supply member, a gas exhausting member and a heating member. The system includes the apparatus and a transfer apparatus.

26 Claims, 6 Drawing Sheets

REACTION CHAMBER FOR MANUFACTURING A CARBON NANOTUBE, APPARATUS FOR MANUFACTURING THE CARBON NANOTUBE AND SYSTEM FOR MANUFACTURING THE CARBON NANOTUBE

CROSS-REFERENCE TO RELATED APPLICATION

This application claims priority under 35 USC §119 to Korean Patent Application No. 2006-131459 filed on Dec. 21, 2006, the contents of which are herein incorporated by references in their entirety.

BACKGROUND OF THE INVENTION

1. Field of the Invention

Example embodiments of the present invention relate to a reaction chamber for manufacturing a carbon nanotube, an apparatus for manufacturing the carbon nanotube, and a system for manufacturing the carbon nanotube. More particularly, example embodiments of the present invention relate to a reaction chamber for manufacturing a carbon nanotube having a high purity at a high temperature, an apparatus having the reaction chamber for manufacturing the carbon nanotube, and a system including the reaction chamber for manufacturing the carbon nanotube.

2. Description of the Related Art

A carbon nanotube as an allotrope of carbon may have a crystalline structure in which carbon atoms are combined as a hexagonal honeycomb structure. The carbon nanotube usually has a diameter of about several nanometers. Since the carbon nanotube has excellent mechanical properties, field emission characteristics, an electrical selectivity and a highly efficient hydrogen storing property, the carbon nanotube is widely employed in various fields such as an aeronautical and space engineering, environmental and energy industries, a material and pharmaceutical engineering, electric and electronic apparatuses, biotechnology, security control technology, etc.

A conventional carbon nanotube is obtained by an electric discharging process, a plasma chemical vapor deposition (CVD) process, a thermal CVD process, a thermal decomposition process, etc. Particularly, the thermal CVD process and the thermal decomposition process are generally employed for manufacturing the conventional carbon nanotube.

FIG. 1 is a schematic cross-sectional view showing a conventional apparatus for manufacturing a carbon nanotube.

To manufacture a carbon nanotube by a thermal CVD process or a thermal decomposition process, the conventional apparatus for manufacturing the carbon nanotube includes a cylindrical reaction tube 1 and a heating member 3 for heating the reaction tube 1 as shown in FIG. 1. The heating member 3 includes a heating coil enclosing the cylindrical reaction tube 1. The reaction tube 1 may be heated by the heating member 3 at a temperature above 1,000° C.

The conventional apparatus for manufacturing the carbon nanotube shown in FIG. 1, a gas is provided into the reaction tube 1 through one lateral portion of the reaction furnace, and the gas is exhausted from the reaction furnace 1 through the other lateral portion of the reaction tube 1. After a substrate is loaded in the reaction tube 1, the carbon nanotube is formed on the substrate by heating the reaction tube 1 to a high temperature while providing the gas onto the substrate.

In the conventional apparatus for manufacturing the carbon nanotube, however, the heating member 3 partially encloses the reaction tube 1 because other elements of the conventional apparatus may have thermal damages when the heating member 3 entirely encloses the reaction tube 1. Hence, a space of the reaction tube 1 for forming the carbon nanotube may be relatively reduced and an efficiency of the conventional apparatus may be deteriorated. That is, the substrate is positioned only in the space of the reaction tube 1 enclosed by the heating member 3 so that the efficiency of the conventional apparatus may be reduced. More particularly, only 40 to 60 percent of an entire inside of the reaction tube 1 may be utilized as the space for forming the carbon nanotube. Additionally, the gas may not be uniformly provided into the reaction tube 1 to deteriorate a purity of the carbon nanotube because the gas passes through relatively wide portions in the reaction tube 1 until the gas reaches at the substrate positioned in a space of the reaction tube 1 for forming the carbon nanotube. The carbon nanotube manufactured using the conventional apparatus may have a poor purity, and the conventional apparatus may not advantageously employed in high-volume manufacturing since the efficiency of the conventional apparatus is reduced and the gas is not uniformly provided onto the substrate. Furthermore, the heating member 3 directly heats the reaction tube 1 of the conventional apparatus such that a durability of the reaction tube 1 may be considerably deteriorated.

SUMMARY OF THE INVENTION

Example embodiments of the present invention provide a reaction chamber for manufacturing a carbon nanotube to ensure a high purity of the carbon nanotube and a high spatial and production efficiency of the reaction chamber.

Example embodiments of the present invention provide an apparatus for manufacturing a carbon nanotube to ensure a high purity of the carbon nanotube and a high spatial and production efficiency of the apparatus.

Example embodiments of the present invention provide a system for manufacturing a carbon nanotube to ensure a high purity of the carbon nanotube and a high spatial and production efficiency of the system.

According to one aspect of the present invention, there is provided a reaction chamber for manufacturing a carbon nanotube, which includes a reaction furnace, a gas inlet, a gas outlet and a heat transfer member. The reaction furnace may have a box structure for receiving a substrate. The reaction furnace may provide a space for forming the carbon nanotube on the substrate. The gas inlet may have a through-hole structure formed at a first portion of the reaction chamber. The gas inlet may provide a passage for an inflow of a source gas for forming the carbon nanotube into the reaction chamber. The gas outlet may have a through-hole structure formed at a second portion of the reaction chamber. The gas outlet may provide a passage for an outflow of the source gas from the reaction chamber. The heat transfer member may have at least one rectangular through-hole structure formed at a third portion of the reaction chamber along a direction substantially in parallel to the substrate. The heat transfer member may provide a passage for transferring a heat to heat up the reaction chamber.

In example embodiments of the present invention, the reaction furnace may include quartz, graphite or a mixture of quartz and graphite.

In example embodiments of the present invention, the reaction furnace may have a rectangular box structure that has a minor axis substantially perpendicular to the substrate, and a major axis substantially in parallel to the substrate and substantially longer than the minor axis.

In example embodiments of the present invention, the gas inlet and the gas outlet may be opposite to each other.

In example embodiments of the present invention, wherein the heat transfer member may include a plurality of through-hole structures formed at portions of the reaction furnace facing with a front face and a rear face of the substrate loaded in the reaction furnace.

In example embodiments of the present invention, the reaction chamber may include a pressure control passage having a through-hole structure formed at a fourth portion of the reaction furnace. The pressure control passage may provide a passage for adjusting a pressure of the reaction furnace.

In example embodiments of the present invention, the reaction furnace may further include an opening and closing member having a door structure, a shutter structure or a sliding structure provided at a lateral portion of the reaction chamber. The substrate may be loaded/unloaded into/from the reaction furnace through the opening and closing member.

According to another aspect of the present invention, there is provided an apparatus for manufacturing a carbon nanotube, which includes a reaction chamber, a gas supply member and a heating member. The reaction chamber includes a reaction furnace, a gas inlet, a gas outlet and a heat transfer member. The reaction furnace may have a box structure for receiving a substrate. The reaction furnace may provide a space for forming the carbon nanotube on the substrate. The gas inlet may have a through-hole structure formed at a first portion of the reaction furnace. The gas inlet may provide a passage for an inflow of a source gas for forming the carbon nanotube into the reaction furnace. The gas outlet may have a through-hole structure formed at a second portion of the reaction furnace. The gas outlet may provide a passage for an outflow of the source gas from the reaction furnace. The heat transfer member may have at least one rectangular through-hole structure formed at a third portion of the reaction furnace along a direction substantially in parallel to the substrate. The heat transfer member may provide a passage for transferring s heat for heating up the reaction furnace. The gas supply member may be connected to the gas inlet so as to provide the source gas into the reaction furnace through the gas inlet. The gas exhausting member may be connected to the gas outlet so as to exhaust the source gas from the reaction furnace through the gas outlet. The heating member may face with the heat transfer member to provide the heat into the reaction furnace through the heat transfer member, to thereby heat the reaction furnace.

In example embodiments of the present invention, the reaction furnace may include quartz, graphite or a mixture of quartz and graphite. The reaction furnace may have a rectangular box structure that has a minor axis substantially perpendicular to the substrate, and a major axis substantially in parallel to the substrate and substantially longer than the minor axis.

In example embodiments of the present invention, the gas inlet and the gas outlet may be opposite to each other. The heat transfer member may include a plurality of through-hole structures formed at portions of the reaction furnace facing with a front face and a rear face of the substrate loaded in the reaction furnace.

In example embodiments of the present invention, the apparatus may further include a pressure control passage and a pressure control member. The pressure control passage may have a through-hole structure formed at a fourth portion of the reaction furnace. The pressure control passage may provide a passage for adjusting a pressure of the reaction furnace. The pressure control member may be connected to the pressure control passage so as to adjust the pressure in the reaction chamber through the pressure control passage.

In example embodiments of the present invention, the reaction furnace may include an opening and closing member having a door structure, a shutter structure or a sliding structure provided at a lateral portion of the reaction chamber. Here, the substrate may be loaded/unloaded into/from the reaction furnace through the opening and closing member.

In example embodiments of the present invention, the heating member may include a lamp, a reflection plate and a heating plate. The reflection plate may reflect a heat generated from the lamp toward the heat transfer member. The heating plate may cover the heat transfer member to sufficiently transfer the heat generated from the lamp toward the heat transfer member.

In example embodiments of the present invention, the lamp may include a halogen lamp or an infrared lamp.

In example embodiments of the present invention, the heating plate may include quartz, graphite or a mixture of quartz and graphite. Here, the apparatus may further include a sealing member for sealing a peripheral portion of the heating plate sufficiently covering the heat transfer member.

In an example embodiment of the present invention, the apparatus may include at least two stacked reaction chambers.

In example embodiments of the present invention, a boat may be installed in the reaction furnace of the reaction chamber. Here, the substrate may be loaded on the boat.

In example embodiments of the present invention, heat conversing members opposite to each other may be disposed at inner lateral portions of the reaction furnace of the reaction chamber. Each of the heat conversing members may concentrate a heat transferred into the reaction chamber toward a center of the reaction chamber.

In example embodiments of the present invention, the gas supply member may include a shower head having a plurality of spraying holes toward the gas inlet.

According to still another aspect of the present invention, there is provided a system for manufacturing a carbon nanotube, which includes an apparatus for manufacturing the carbon nanotube and a transfer apparatus coupled to the apparatus. The apparatus includes a reaction chamber, a gas supply member, a gas exhausting member and a heating member. The reaction chamber includes a reaction furnace, a gas inlet, a gas outlet and a heat transfer member. The reaction furnace may have a box structure for receiving a substrate and may provide a space for forming the carbon nanotube on the substrate. The gas inlet may have a through-hole structure formed at a first portion of the reaction furnace and may provide a passage for an inflow of a source gas for forming the carbon nanotube in the reaction furnace. The gas outlet may have a through-hole structure formed at a second portion of the reaction furnace and may provide a passage for an outflow of the source gas from the reaction furnace. The heat transfer member may have at least one rectangular through-hole structure formed at a third portion of the reaction furnace along a direction substantially in parallel to the substrate, and may provide a passage for transferring a heat to heating up the reaction furnace. The gas supply member may be connected to the gas inlet in order to provide the source gas into the reaction furnace through the gas inlet. The gas exhausting member may be connected to the gas outlet so as to exhaust the source gas from the reaction furnace through the gas outlet. The heating member may face with the heat transfer member to provide the heat into the reaction furnace through the heat transfer member and thus heat the reaction furnace.

The substrate may be loaded/unloaded into/from the reaction furnace through the transfer apparatus.

In example embodiments of the present invention, a gate valve may be installed between the apparatus for manufacturing the carbon nanotube and the transfer apparatus. The transfer apparatus and the apparatus for manufacturing the carbon nanotube may be connected to each other by the gate valve.

In example embodiments of the present invention, the system may include a pressure control passage and a pressure control member. The pressure control passage, which may have a through-hole structure formed at a fourth portion of the reaction furnace, may provide a passage for adjusting a pressure of the reaction furnace. The pressure control member may be connected to the pressure control passage so as to adjust the pressure of the reaction chamber through the pressure control passage.

In example embodiments of the present invention, the reaction furnace may include an opening and closing member having a door structure, a shutter structure or a sliding structure provided at a lateral portion of the reaction chamber toward the transfer apparatus. The substrate may be loaded/unloaded into/from the reaction furnace through the opening and closing member.

In example embodiments of the present invention, the heating member may include a heat source, a reflection plate and a heating plate. The heat source may include a halogen lamp or an infrared lamp. The reflection plate may reflect a heat generated from the heat source toward the heat transfer member. The heating plate may cover the heat transfer member to sufficiently transfer the heat generated from the heat source toward the heat transfer member.

In example embodiments of the present invention, the system may further include a boat installed in the reaction furnace of the reaction chamber. Here, the substrate may be loaded on the boat.

In example embodiments of the present invention, heat conversing members opposite to each other may be disposed at inner lateral portions of the reaction furnace of the reaction chamber. Each of the heat conversing members may concentrate a heat transferred into the reaction chamber toward a center of the reaction chamber.

According to embodiments of the present invention, a reaction chamber may include a box structure reaction furnace for manufacturing a carbon nanotube. Additionally, an apparatus and a system for manufacturing a carbon nanotube may include the reaction chamber having the reaction furnace together with other suitable elements such as a heating member, a gas supply member, a gas exhausting member, etc. Therefore, efficiencies of each of the reaction chamber, the apparatus and the system may be enhanced, and also a purity of the carbon nanotube obtained using the reaction chamber, the apparatus and the system may be improved.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF THE EMBODIMENTS

Figure 1:
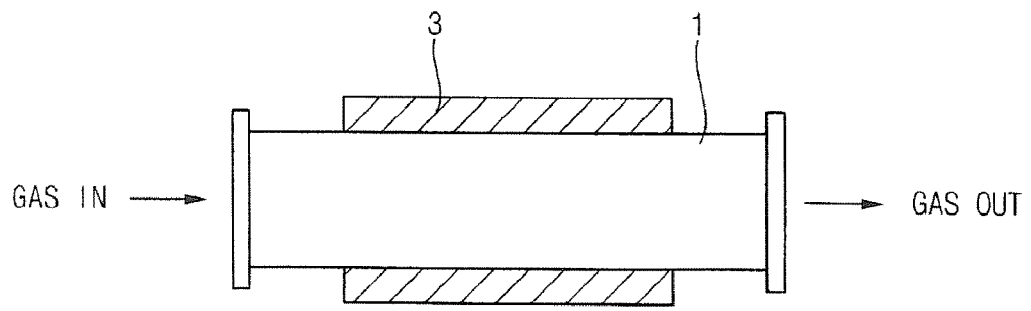
FIG. 1 is a schematic cross-sectional view illustrating a conventional apparatus for manufacturing a carbon nanotube.

The present invention is described more fully hereinafter with reference to the accompanying drawings, in which example embodiments of the present invention are shown. The present invention may, however, be embodied in many different forms and should not be construed as limited to the example embodiments set forth herein. Rather, these embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like reference numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reaction Chamber

Figure 2:
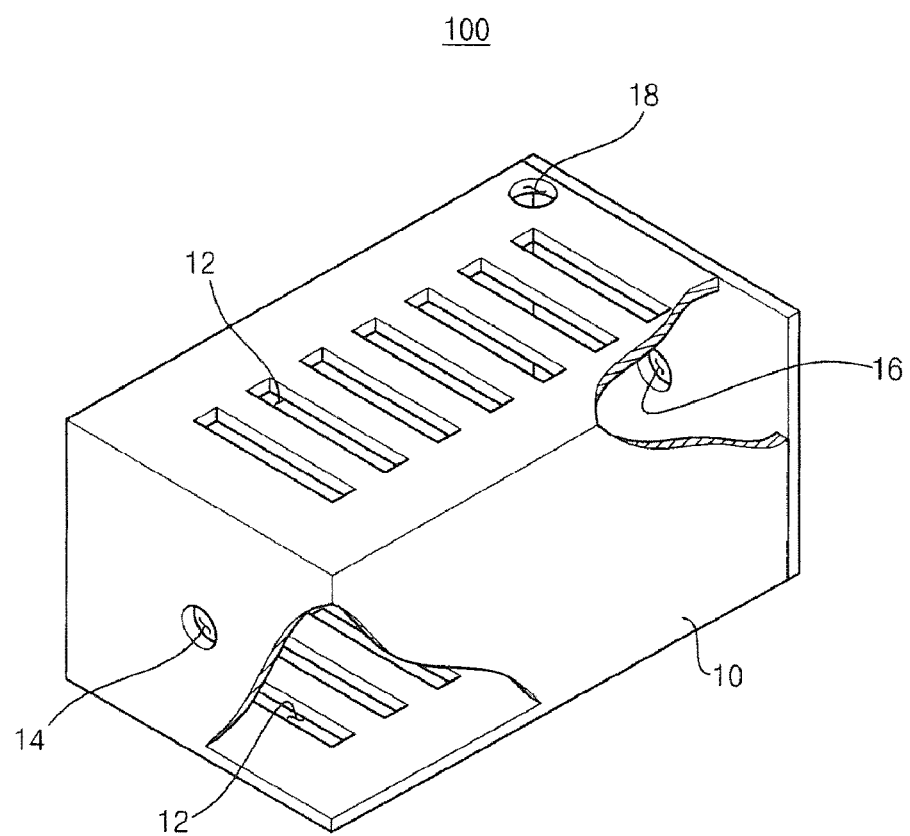
FIG. 2 is a partially cut perspective view illustrating a reaction chamber for manufacturing a carbon nanotube in accordance with example embodiments of the present invention.
Figure 3:
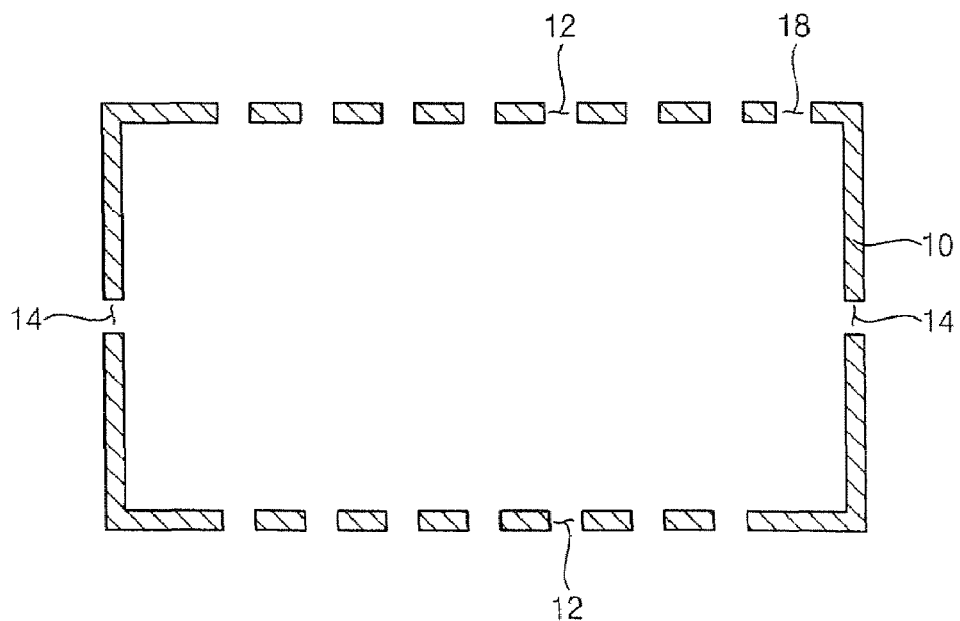
FIG. 3 is a cross-sectional view illustrating the reaction chamber in FIG. 2.

FIG. 2 is a partially cut perspective view illustrating a reaction chamber for manufacturing a carbon nanotube in accordance with example embodiments of the present invention. FIG. 3 is a cross-sectional view illustrating the reaction chamber in FIG. 2.

Referring to FIGS. 2 and 3, a reaction chamber 100 includes a reaction furnace 10, a gas inlet 14, a gas outlet 16, a heat transfer member 12 and a pressure control passage 18.

The reaction furnace 10 may provide a space for forming a carbon nanotube on a substrate loaded in the reaction furnace 10. For example, the reaction furnace 10 may have a box structure.

In example embodiments of the present invention, the space of the reaction furnace 10 may be designed considering a loading of the substrate because the substrate may be loaded into the reaction furnace 10 along a first direction substantially in parallel to a lengthwise direction of the reaction furnace 10. For example, the reaction furnace may have a rectangular box structure that has a first length (a major axis) along the first direction longer than a second length (a minor axis) along a second direction substantially perpendicular to the first direction.

In other example embodiments of the present invention, the space of the reaction furnace 10 may be determined considering parallel loading of several substrates when the substrates may be loaded into the reaction furnace 10 along the first direction.

In still other example embodiments of the present invention, a plurality of substrates may be loaded and stacked in the reaction furnace 10 so that the space of the reaction furnace 10 may be designed by considering how the stacked substrates is to be constructed.

In example embodiments of the present invention, one substrate or a plurality of substrates may be loaded into the reaction furnace 10 or unloaded from the reaction furnace 10 using a boat described as follows.

In example embodiments of the present invention, the reaction furnace 10 may be formed using a proper refractory material to ensure a sufficient mechanical stability under a high temperature, because the process for forming the carbon nanotube may be carried out at a relatively high temperature. For example, the carbon nanotube may be formed in the reaction furnace 10 at a high temperature of about 500° C. to about 1,100° C. Examples of the refractory material used for the reaction furnace 10 may include quartz or graphite. These may be used alone or in a mixture thereof.

The gas inlet 14 may provide a passage through which a source gas for forming the carbon nanotube may flow from a source gas reservoir (not illustrated) into the reaction furnace 10. The gas inlet 14 may have a through-hole structure formed at a first portion of the reaction furnace 10. The gas outlet 16 may provide a passage where a remaining gas may flow from the reaction furnace 10 to an outside of the reaction furnace 10. The gas outlet 16 may also have a structure that includes a through-hole structure formed at a second portion of the reaction furnace 10.

In example embodiments of the present invention, the gas inlet 14 and the gas outlet 16 may correspond to each other. For example, the source gas may be provided through the gas inlet 14, whereas the remaining source gas may be exhausted through the gas outlet 16. The gas inlet 14 and the gas outlet 16 may be opposite to each other.

In some example embodiments of the present invention, the pressure control passage 18 may provide a passage for adjusting a pressure of the reaction furnace 10. For example, the pressure control passage 18 may provide a passage for reducing the pressure of the reaction furnace 10 while forming the carbon nanotube in the reaction furnace 10. The pressure control passage 18 may have a structure that includes a through-hole structure formed at a predetermined portion of the reaction furnace 10. The pressure control passage 18 may not be closely adjacent to the gas inlet 14, the gas outlet 16 and the heat transfer member 12. For example, the through-hole structure of the pressure control passage 18 may be formed at a third portion of the reaction furnace 10 such as an upper peripheral portion of the reaction furnace 10 as illustrated in FIG. 2.

In other example embodiments of the present invention, the reaction furnace 10 may not include the pressure control passage 18. Here, the pressure of the reaction furnace 10 may be adjusted through the gas inlet 14 and/or the gas outlet 16. That is, a pressure control member (not illustrated) may be connected to the gas inlet 14 and/or the gas outlet 16 to thereby control the pressure of the reaction furnace 10.

The heat transfer member 12 may provide a passage for transferring heat into the reaction furnace 10 so as to heat an inside of the reaction furnace 10. The heat transfer member 12 may have at least one rectangular through-hole structure formed at a fourth portion of the reaction furnace 10. The heat transfer member 12 may not be adjacent to the gas inlet 14 and the gas outlet 16. In example embodiments, rectangular through-hole structures of the heat transfer member 12 may be formed substantially in parallel to the substrate loaded into the reaction furnace 10. Here, the rectangular through-hole structure of the heat transfer member 12 may be arranged along the first direction substantially in parallel to the lengthwise direction of the reaction furnace 10. Alternatively, the rectangular through-hole structures of the heat transfer member 12 may be formed along the second direction substantially perpendicular to the lengthwise direction of the reaction furnace 10 as illustrated in FIG. 2.

In example embodiments of the present invention, a plurality of heat transfer members 12 may be provided so as to efficiently ensure heat transfer for heating the inside of the reaction furnace 10 up to a temperature of about 500° C. to about 1,100° C. When several heat transfer members 12 are formed at the predetermined portion of the reaction furnace 10, some heat transfer members 12 may correspond to a front face of the substrate loaded in the reaction furnace, whereas other heat transfer members 12 may correspond to a rear face of the substrate. Considering a size of the reaction furnace 10, the heat transfer members 12 may be formed from one end portion of the reaction furnace 10 to the other end portion of the reaction furnace 10 along the first direction substantially in parallel to the lengthwise direction of the reaction furnace 10.

In the reaction chamber 100 illustrated in FIGS. 2 and 3, the gas inlet 14 and the gas outlet 16 may be opposite to each other along the second direction substantially perpendicular to the lengthwise direction of the reaction furnace 10. Here, the gas inlet 14 and the gas outlet 16 may be formed at the first and second lateral portions of the reaction furnace 10, respectively. The heat transfer members 12 may be opposite to one another. The heat transfer members 12 may be provided at an upper portion and a lower portion of the reaction furnace 10. The pressure control passage 18 may be formed at the upper peripheral portion of the reaction furnace 10. The pressure control passage 18 may not be superimposed with the heat transfer members 12.

Figure 4:
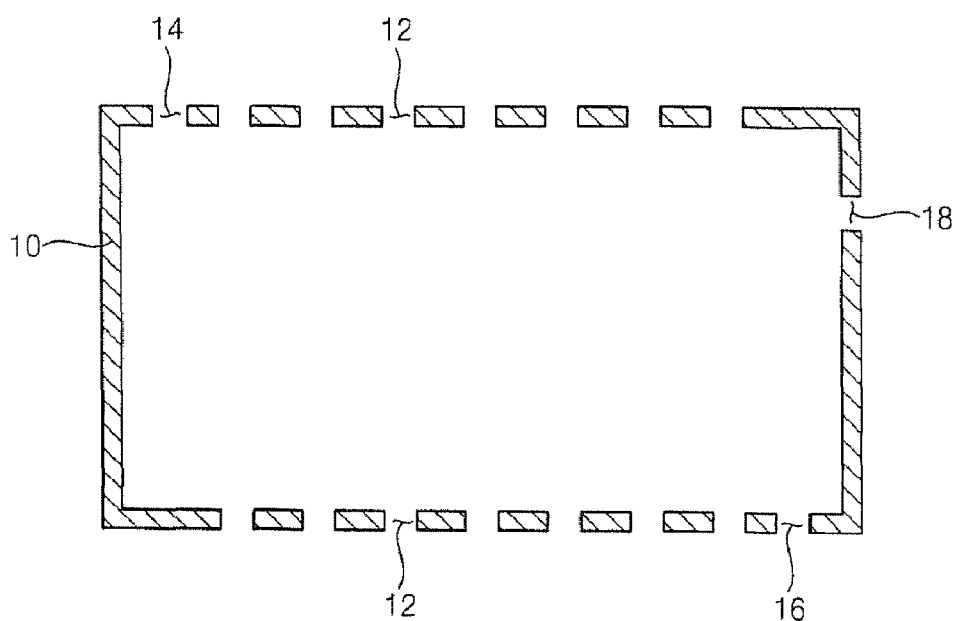
FIG. 4 is a cross-sectional view illustrating a reaction chamber for manufacturing a carbon nanotube in accordance with example embodiments of the present invention.

In example embodiments of the present invention, positions of the gas inlet 14, the gas outlet 16, the heat transfer members 12 and the pressure control passage 18 may vary in accordance with an efficiency of the reaction chamber 100 and process conditions for forming the carbon nanotube. For example, as illustrated in FIG. 4, the gas inlet 14 and the gas outlet 16 may be formed at an upper portion and a lower portion of the reaction furnace 10, respectively. Further, the pressure control passage 18 may be formed at a lateral portion of the reaction furnace 10 substantially perpendicular to the length of the reaction furnace 10. Hence, the gas inlet 14, the gas outlet 16, the heat transfer member 12 and the pressure control passage 18 may have various positions considering the inflow and outflow of the source gas, the transfer of heat, the pressure of the reaction furnace 10, the efficiency of the reaction chamber 100, etc.

The reaction furnace 10 of the reaction chamber 100 may include an opening and closing member formed at a later portion of the reaction furnace 10. The opening and closing member may have a door structure so as to load/unload the substrate into/from the reaction furnace 10. For example, the opening and closing member may be formed at the lateral portion of the reaction furnace 10 where the gas outlet 16 is positioned.

In example embodiments of the present invention, the opening and closing member may have a shutter structure or a slide structure so as to easily load/unload the substrate into/from the reaction tube 10. The opening and closing member positioned at the lateral portion of the reaction furnace 10 may be sufficiently sealed. Thus, a sealing member may be provided to seal the opening and closing member disposed at the lateral portion of the reaction furnace 10.

According to example embodiments of the present invention, the reaction chamber 100 may have the box structure and may include suitable elements such as the heat transfer member 12 and the pressure control passage 18 so that the reaction chamber 100 may have an improved spiral efficiency and the carbon nanotube may have a high purity using the reaction chamber 100.

Apparatus for Manufacturing a Carbon Nanotube

Hereinafter, an apparatus for manufacturing a carbon nanotube including a reaction chamber will be described in detail with reference to the accompanying drawings.

Figure 5:
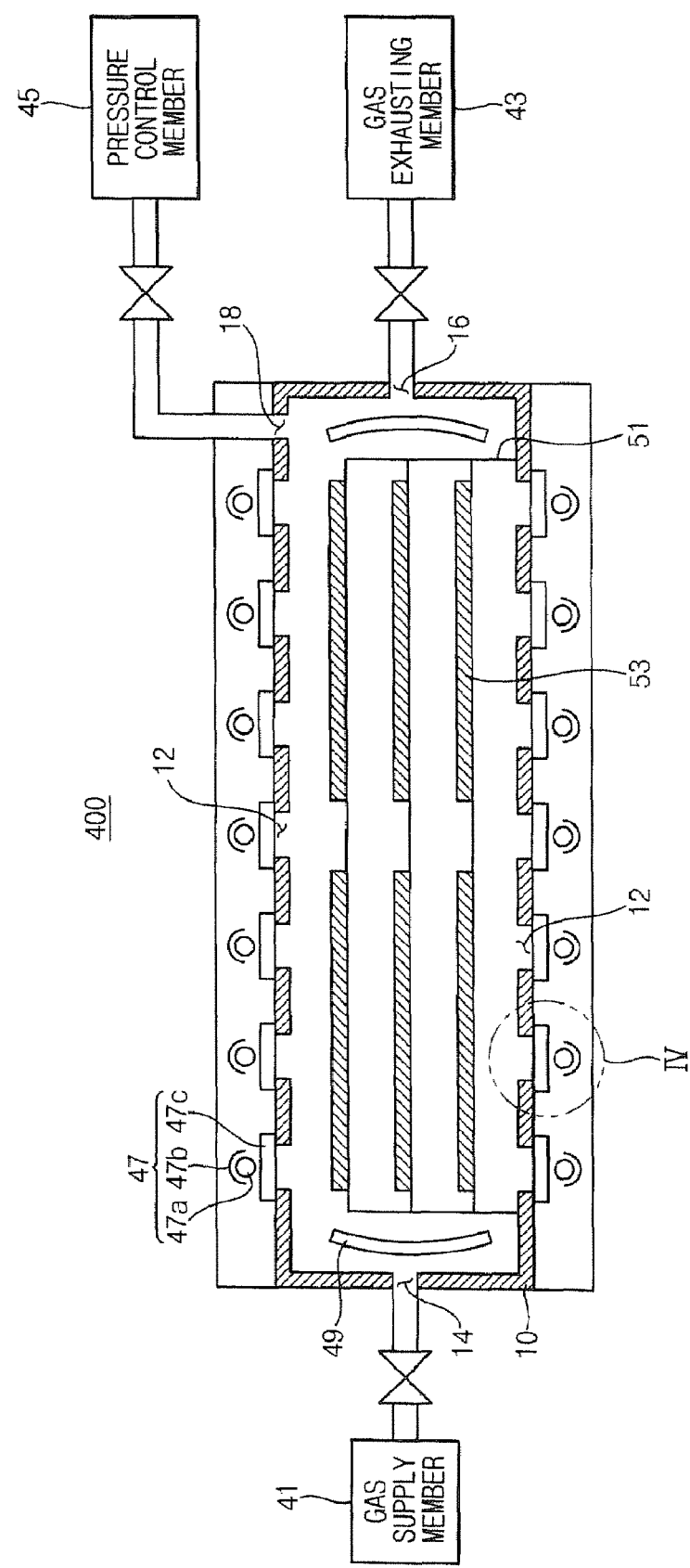
FIG. 5 is a cross-sectional view illustrating an apparatus for manufacturing a carbon nanotube in accordance with example embodiments of the present invention.

FIG. 5 is a cross-sectional view illustrating an apparatus for manufacturing a carbon nanotube in accordance with example embodiments of the present invention. In FIG. 5, an apparatus 400 for manufacturing the carbon nanotube includes a reaction chamber 100 having a construction substantially similar to or substantially the same as that of the reaction chamber described with reference to FIG. 1.

Referring to FIG. 5, the apparatus 400 for manufacturing the carbon nanotube includes the reaction chamber 100, a gas supply member 43, a heating member 47 and a pressure control member 45.

In example embodiments of the present invention, the reaction chamber 100 may include a reaction furnace 10, a gas inlet 14, a gas outlet 16, a heat transfer member 12 and a pressure control passage 18 as described above. The reaction chamber 100 may also have a construction substantially similar to or substantially the same as that of the reaction chamber described with reference to FIGS. 3 and 4.

The gas supply member 41 may provide a source gas for forming the carbon nanotube into the reaction furnace 10 through the gas inlet 14. The gas supply member 41 may be connected to the gas inlet 14. In example embodiments, the gas supply member 41 may include a reservoir for receiving the source gas, a supply line connecting the gas inlet 14 to the reservoir, and a valve installed in the supply line to control a supply of the source gas. In an example embodiment, the gas supply member 41 may additionally include a mass flow controller (MFC) to easily control a flow rate of the source gas.

Figure 6:
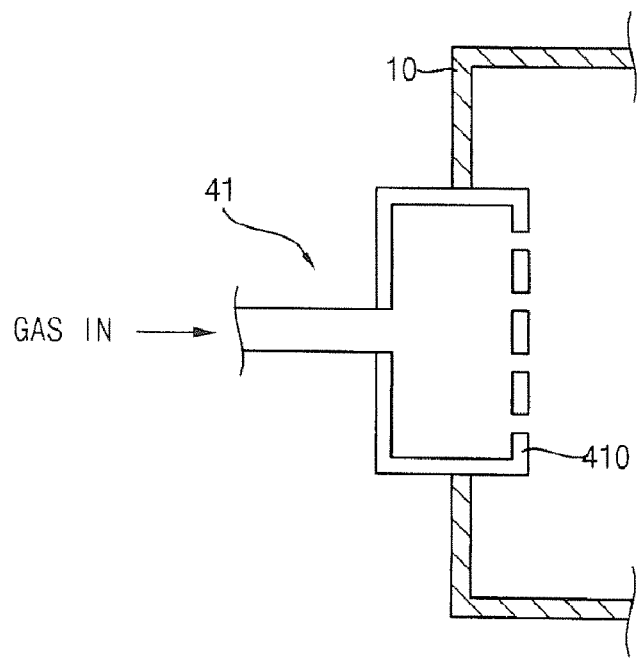
FIG. 6 is a partially cut cross-sectional view illustrating a gas supply member of an apparatus for manufacturing a carbon nanotube in accordance with example embodiments of the present invention.

In example embodiments of the present invention, as illustrated in FIG. 6, the gas supply member 41 may include a shower head 410 formed at a lateral portion of the reaction furnace 10 connected to the gas inlet 14 so as to uniformly provide the source gas into the reaction furnace 10 of the reaction chamber 100. The shower head 410 may include a plurality of spray holes toward an inside of the reaction furnace 10. The shower head 410 may be directly coupled to the gas inlet 14. Alternatively, the shower head 410 may be installed in the reaction furnace 10 through the gas inlet 14.

The gas exhausting member 43 may exhaust a remaining source gas from the reaction furnace 10 to an outside of the reaction furnace 10 through the gas outlet 16. The gas exhausting member 43 may be connected to the gas outlet 16. In example embodiments, the gas exhausting member 43 may include an exhausting line connected to the gas outlet 16, a valve installed for controlling an exhaust of the source gas, etc. In an example embodiment, the gas exhausting member 43 may further include a filter for filtering the source gas and a pump for easily exhausting the source gas from the reaction furnace 10. Alternatively, the gas exhausting member 43 may include a flexible line when the gas exhausting member 43 is coupled to a lateral portion of the reaction furnace 10 including an opening and closing member.

The pressure control member 45 may adjust an internal pressure of the reaction furnace 10 through the pressure control passage 18. The pressure control member 45 may be connected to the pressure control passage 18. In example embodiments, the pressure control member 45 may include a control line connected to the pressure control passage 18, a vacuum pump for pumping the reaction furnace 10, a valve for controlling the vacuum pump, etc.

The heating member 47 may heat the reaction furnace 10 by transferring heat into the reaction furnace 10 through the heat transfer passage 12. The heating member 47 may face with the heat transfer passage 12. In example embodiments, the heating member 47 may include a heat source such as a lamp 47a, a reflection plate 47b and a heating plate 47c. The lamp 47a may include a halogen lamp or an infrared lamp in accordance with heating efficiency of the heating member 47. The reflection plate 47b may sufficiently reflect a heat generated from the lamp 47a toward the heat transfer passage 12. The reflection plate 47b may have a cap structure enclosing the lamp 47a. The reflection plate 47b may include a reflective metal such as gold (Au), platinum (Pt) or aluminum (Al) considering a reflection efficiency of the reflection plate 47b. The heating plate 47c may transfer the heat generated from the lamp 47a to sufficiently heat the heat transfer passage 12. The heating plate 47c may sufficiently cover the heat transfer passage 12.

Figure 7:
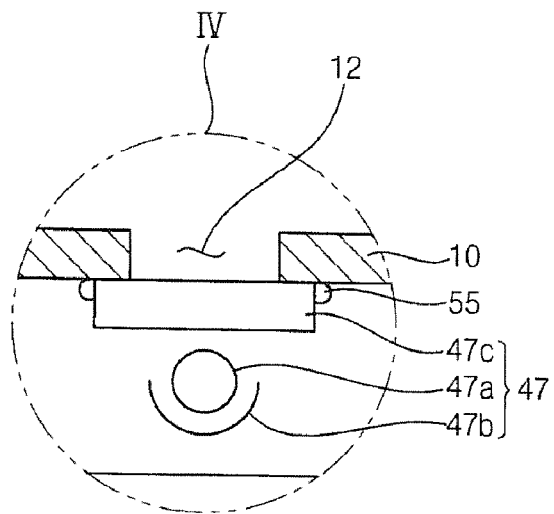
FIG. 7 is an enlarged cross-sectional view illustrating "IV" portion in FIG. 5.

In example embodiments of the present invention, the heating plate 47c may be sufficiently sealed when the heating plate 47c covers the heat transfer passage 12. As illustrated in FIG. 7, a sealing member 55 may be provided to seal a peripheral portion of the heating plate 47c enclosing the heat transfer passage 12. The heating plate 47c may include a refractory material so that the heating plate 47c may effectively transfer the heat generated from the lamp 47a and also may sufficiently endure the heat generated from the lamp 47a. Thus, the heating plate 47c may include quartz or graphite. These may be used alone or in a mixture thereof.

In example embodiments of the present invention, a plurality of heating members 47 may be provided when a plurality of heat transfer passages 12 is formed at portions of the reaction furnace 10. Here, the heating members 47 may correspond to the heat transfer passages 12, respectively. Since each of the heating members 47 may be independently disposed adjacent to each of the heat transfer passages 12, the heating members 47 may be positioned adjacent to one end portion of the reaction furnace 10 and adjacent to the other end portion of the reaction furnace 10. Therefore, the apparatus 400 for manufacturing the carbon nanotube may have an improved spiral efficiency for heating the reaction furnace 10. Additionally, the heating members 47 may be independently provided in the apparatus 400 such that other members adjacent to the heating members 47 may not have thermal damages.

Since the apparatus 400 for manufacturing the carbon nanotube includes at least one heating member 47 as described above, the reaction furnace 10 of the reaction chamber 100 may be advantageously heated considering process conditions for forming the carbon nanotube.

In example embodiments of the present invention, the apparatus 400 for manufacturing the carbon nanotube may further include a boat 51 and at least one heat converging member 49. The boat 51 may be installed in the reaction furnace 10. The substrate 53 may be placed on the boat 51 in the reaction furnace 10. The boat 51 may have various dimensions in accordance with several conditions such as the total number of substrates 53 loaded in the reaction furnace 10, the stacked number of the substrate 53, etc. Further, the boat 53 may have suitable dimensions considering the spiral efficiency of the apparatus 400 for manufacturing the carbon nanotube. For example, the boat 53 may have a size for sufficiently receiving two substrate in a row and three substrates in a column when six substrates are loaded in the reaction furnace 10. The boat 53 may include a refractory material because the boat 53 may effectively endure the heat generated from the lamp 47a. Hence, the boat 53 may include quartz or graphite. These may be used alone or in a mixture thereof. The boat 53 may be fixed in the reaction furnace 10. Alternatively, the boat 53 may move into or out of the reaction furnace 10.

The heat converging member 49 may concentrate the heat that is transferred into the reaction furnace 10 through the heat transfer passage 12. The heat may be converged toward the substrate 53 loaded in the reaction furnace 10 through the heat converging member 49. In example embodiments, two heat converging members 49 may be provided at inner lateral portions of the reaction furnace 10 so as to concentrate the heat toward a central portion of the reaction furnace 10. Here, the converging members 49 may face with each other.

As described above, the apparatus 400 for manufacturing the carbon nanotube may include at least one heating member 47 having the lamp 47a for generating the sufficient heat, the reflection plate 47b and the heating plate 47c adjacent to at least one heat converging member 49. Therefore, the reaction furnace 10 of the reaction chamber 100 may be effectively heated considering the process conditions for manufacturing the carbon nanotube. For example, the reaction furnace 100 may be heated to have a temperature of about 500° C. to about 1,100° C.

Figure 8:
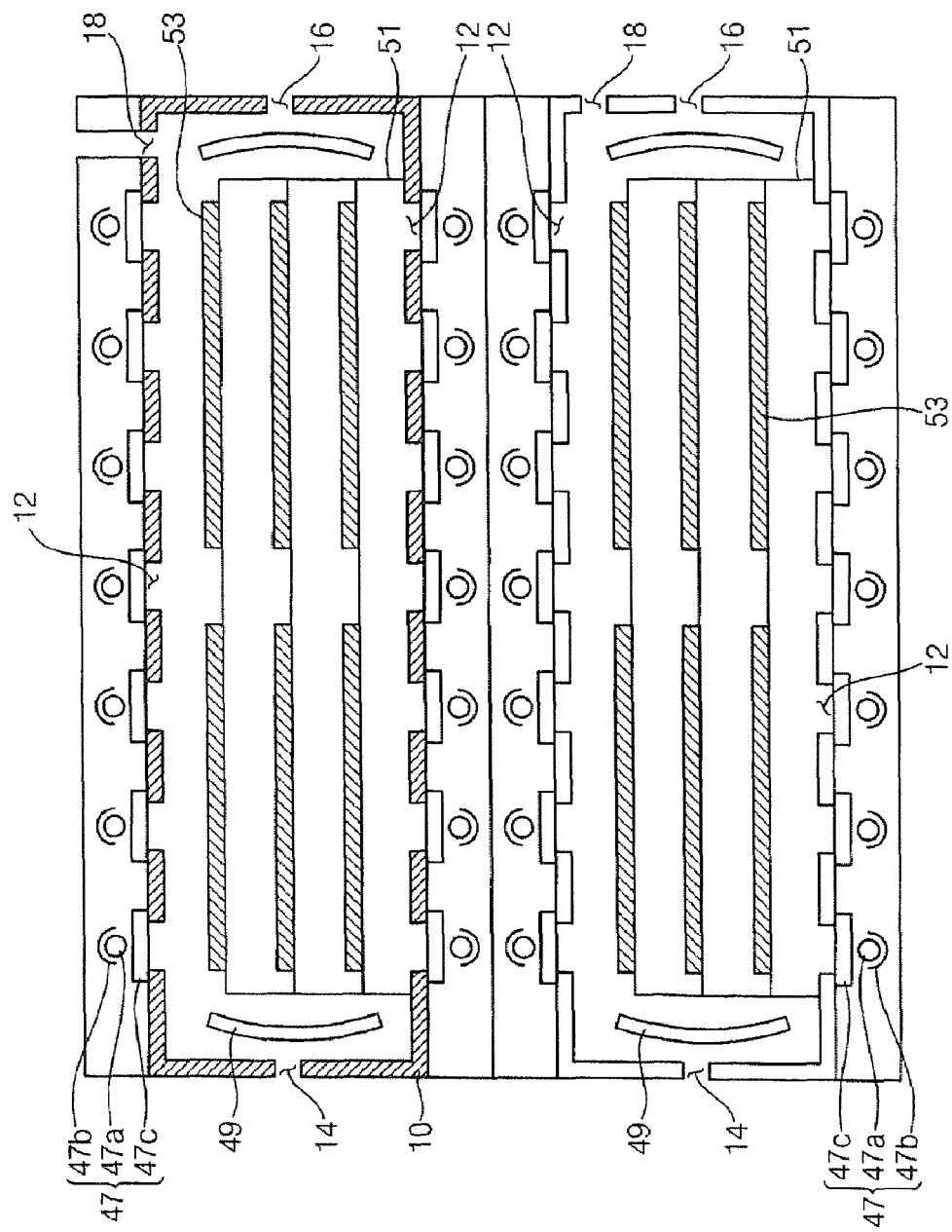
FIG. 8 is a cross-sectional view illustrating an apparatus for manufacturing a carbon nanotube in accordance with example embodiments of the present invention.

In example embodiments of the present invention, the reaction chamber 100 in the apparatus 400 for manufacturing the carbon nanotube may include the reaction furnace 10 having a box structure, so that the apparatus 400 may include at least two reaction chambers 100 as illustrated in FIG. 8. Therefore, a spiral efficiency of the reaction chambers 100 may be considerably improved, and an efficiency of the apparatus 400 for manufacturing the carbon nanotube may be enhanced.

System for Manufacturing a Carbon Nanotube

Hereinafter, a system including an apparatus for manufacturing the carbon nanotube will be described with reference to the accompanying drawings.

Figure 9:
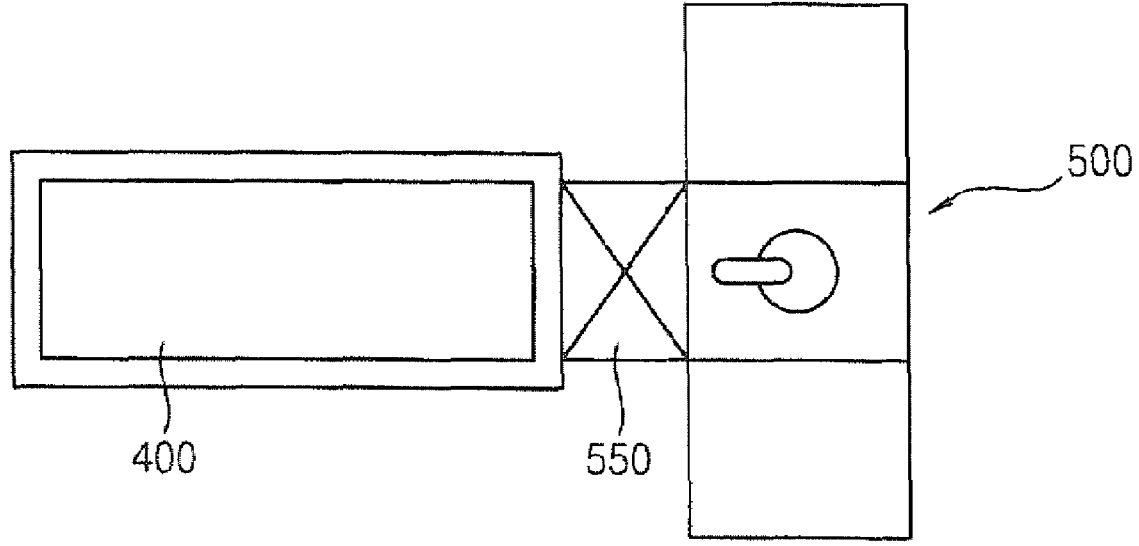
FIG. 9 is a cross-sectional view illustrating a system for manufacturing a carbon nanotube in accordance with example embodiments of the present invention.

FIG. 9 is a cross-sectional view illustrating a configuration of a system for manufacturing a carbon nanotube in accordance with example embodiments of the present invention. In the system for manufacturing the carbon nanotube illustrated in FIG. 9, the system may include a reaction furnace and an apparatus for manufacturing a carbon nanotube substantially similar to or substantially the same as those described with reference to FIGS. 1 and 5, respectively.

Referring to FIGS. 5 and 9, a system 700 for manufacturing a carbon nanotube includes an apparatus 400 for manufacturing the carbon nanotube, a transfer apparatus 500 and a gate valve 550. In example embodiments, the system 700 may further include a cleaning apparatus, a catalyst layer forming apparatus, a catalyst layer etching apparatus, a post-treatment apparatus, etc.

As illustrated in FIGS. 1 and 4, the apparatus 400 for manufacturing the carbon nanotube may include the reaction chamber 100 having the reaction furnace 10, the gas inlet 14, the gas outlet 16, the heat transfer passage 12 and the pressure control passage 18. The apparatus 400 may further include the gas supply member 41, the gas exhausting member 43, the heating member 47, the pressure control member 45 and the heat converging member 49.

The transfer apparatus 500 may load/unload a substrate into/from the reaction furnace 10 of the apparatus 400. The transfer apparatus 500 may be coupled to one side of the apparatus 400 for manufacturing the carbon nanotube. For example, the transfer apparatus 500 may be connected to a portion of the apparatus 400 adjacent to the reaction furnace 10 having an opening and closing member. The transfer apparatus 500 may load/unload the substrate into/from the cleaning apparatus, the catalyst layer forming apparatus, the catalyst layer etching apparatus and/or the post treating apparatus.

In example embodiments of the present invention, the transfer apparatus 500 may include a robot arm having a blade type structure. When the apparatus 400 for manufacturing the carbon nanotube includes the reaction furnace 10 having the box structure, the transfer apparatus 500 may include the robot arm having a length shorter than that of the conventional apparatus due to the improved spiral efficiency of the apparatus 400 for manufacturing the carbon nanotube. That is, a transfer path of the substrate relative to the reaction furnace 10 having the box structure may be reduced so that the transfer apparatus 500 may sufficiently include a relatively short robot arm. Alternatively, a conventionally used transfer apparatus may be advantageously employed in the system 700 for manufacturing the carbon nanotube.

In example embodiments of the present invention, the transfer apparatus 500 may additionally include a waiting area where the substrate is waited before loading the substrate into the reaction furnace. Further, the transfer apparatus 500 may include a storing member for temporarily storing the substrate having the carbon nanotube unloaded from the reaction furnace.

A gate valve 550 is interposed between the transfer apparatus 500 and the apparatus 400 for manufacturing the carbon nanotube. The transfer apparatus 500 may be connected to the apparatus 400 for manufacturing the carbon nanotube through the gate valve 550. The gate valve 550 may alleviate variations of process conditions of the apparatus 400 for manufacturing the carbon nanotube. For example, the gate valve 550 may serve as a load-lock chamber.

The cleaning apparatus, the catalyst layer forming apparatus, the catalyst layer etching apparatus and the post-treatment apparatus may be disposed centering the transfer apparatus 500. The cleaning apparatus may clean the substrate on which the carbon nanotube is formed. The catalyst layer forming apparatus may form a catalyst layer on the substrate before forming the carbon nanotube, and the catalyst layer etching apparatus may etch the catalyst layer to form a catalyst layer pattern having a rugged upper face on the substrate so as to accelerate a formation of the carbon nanotube. When the catalyst layer pattern has a concave and convex surface, the carbon nanotube may be easily formed on the catalyst layer pattern. The post-treatment apparatus may separate the carbon nanotube from the catalyst layer pattern, thereby obtaining the carbon nanotube having a high purity.

According to example embodiments of the present invention, the system 700 for manufacturing the carbon nanotube may include the reaction chamber 100 having the reaction furnace 10 of the box structure. Thus, a spiral efficiency of the system 700 for manufacturing the carbon nanotube may be sufficiently ensured. Additionally, the source gas may be uniformly provided onto the substrate so that the purity and yield of the carbon nanotube may be improved. Furthermore, the conventional transfer apparatus may be employed in the system 700 for manufacturing the carbon nanotube to thereby considerably reduce a maintenance cost and a manufacturing cost.

Method of Forming a Carbon Nanotube

Hereinafter, a method of manufacturing a carbon nanotube according to example embodiments of the present invention will be described in detail by employing the above-described apparatus and system for manufacturing the carbon nanotube.

A substrate on which the carbon nanotube is formed may be provided. The substrate may include a semiconductor substrate, a metal oxide substrate, a glass substrate, etc. For example, the substrate may include a silicon substrate, a silicon-on-insulator (SOI) substrate, an indium tin oxide (ITO) substrate, an ITO-coated glass substrate, a sodalime glass substrate, etc. The substrate may have a sufficient mechanical strength to ensure a formation of the carbon nanotube.

After providing the substrate, the substrate may be loaded into a cleaning apparatus using a transfer apparatus. The cleaning apparatus may effectively remove impurities or foreign materials from the substrate using a cleaning gas or a cleaning solution. In example embodiments, the substrate may be cleaned by a dry cleaning process or a wet cleaning process using the cleaning apparatus. When the substrate is cleaned by the dry cleaning process, the cleaning gas may include an inactive gas. For example, the cleaning gas may include a nitrogen ($N_2$) gas, a helium (He) gas and/or an argon (Ar) gas.

After the substrate may be unloaded from the cleaning apparatus using the transfer apparatus, the substrate may be loaded into a catalysis layer forming apparatus. A catalyst layer may be formed on the substrate using the catalyst layer forming apparatus. The catalyst layer may include iron (Fe) and/or nickel (Ni). The catalyst layer may be formed by a sputtering process or a chemical vapor deposition (CVD) process. Hence, the catalyst layer forming apparatus may have a construction substantially similar to or the same as that of a sputtering apparatus or a CVD apparatus.

The substrate may be unloaded from the catalyst layer forming apparatus using a transfer apparatus 500 of a system 700 for forming a carbon nanotube illustrated in FIG. 9, and then the substrate may be loaded into a catalyst layer etching apparatus. The catalyst layer formed on the substrate may be etched using an etching solution including a hydrogen fluoride (HF) solution diluted with water. The catalyst layer may be etched to form a catalyst layer pattern having an uneven surface such as a concave and convex shape or a rugged shape.

After the substrate may be unloaded from the catalyst layer etching apparatus by using the transfer apparatus 500 of the system 700, the substrate may be loaded into an apparatus 400 for manufacturing a carbon nanotube. When the substrate is loaded into the apparatus 400 for manufacturing the carbon nanotube, a gate valve 550 of the system 700 and a lateral portion of a reaction furnace 100 may be opened. The substrate may be placed on a boat 51 that is installed in the reaction chamber 100. As described above, the boat 51 may have two end portions adjacent to two end portions of the reaction furnace 10, respectively. Additionally, the boat 51 may have a multi-layered structure. Therefore, the substrate may be sufficiently loaded in the reaction furnace 10.

After loading the substrate into the reaction furnace 10 of the reaction chamber 100, the gate valve 550 and the lateral portion of the reaction chamber 100 may be closed. A heating member 47 may heat the reaction furnace 10 up to a temperature of about 500° C. to about 1,100° C. A pressure control member 45 may adjust a pressure of the reaction furnace 10 as a vacuum state.

A source gas for manufacturing the carbon nanotube may be introduced into the reaction furnace 10 from a gas supply member 41. The source gas may include acetylene, ethylene, methane, benzene, xylene, carbon monoxide, carbon dioxide, etc. These may be used alone or in a mixture thereof. After adjusting processing conditions such as a temperature and a pressure of the reaction furnace 10, the source gas may be provided on the substrate to form a carbon nanotube on the substrate where the catalyst layer pattern is formed.

In example embodiments of the present invention, the heating member 47 may be provided from one end portion of the reaction furnace 10 to the other end portion of the reaction furnace 10. Thus, the heating member 47 may uniformly heat the reaction furnace 10, thereby preventing thermal damages to the carbon nanotube. Additionally, the source gas may be uniformly provided onto the substrate because a flow passage of the source gas is relatively shorter than that of the conventional apparatus for forming the carbon nanotube. As a result, the system 700 for forming the carbon nanotube may produce the carbon nanotube having a high purity.

After forming the carbon nanotube on the substrate, a remaining gas may be removed from the reaction furnace 10 using a gas exhausting member 43. The substrate having the carbon nanotube thereon may be unloaded from the apparatus 400 using the transfer apparatus 500 of the system 700, and then the substrate may be transferred into a post-treatment apparatus. When the substrate is unloaded from the apparatus 400, the gate valve 550 of the system 700 and the lateral portion of the reaction chamber 100 may be opened.

Using the post-treatment apparatus, the carbon nanotube may be obtained by separating the catalyst layer pattern from the carbon nanotube. Thus, processes for forming the carbon nanotube may be accomplished.

According to example embodiments of the present invention, a system and an apparatus for manufacturing a carbon nanotube may have effective sizes because the system and the apparatus include a reaction furnace having a box structure and a heat transfer member having a rectangular through-hole structure formed adjacent one end portion and the other end portion of the reaction furnace. The system and the apparatus for manufacturing the carbon nanotube may produce a carbon nanotube having a high purity by uniformly providing a source gas onto a substrate. Thus, the carbon nanotube formed using the system and the apparatus for manufacturing the carbon nanotube may have enhanced reliability. Additionally, a process for manufacturing the carbon nanotube may take less time to perform and may increase a stability of the process by decreasing a transfer time of the substrate and the sizes of the system and the apparatus. Furthermore, the reaction furnace may be heated by a proper heating member such as a lamp so that a durability of a reaction chamber may be improved and a maintenance cost for the system and the apparatus may be reduced.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A reaction chamber for manufacturing a carbon nanotube, comprising:
    a reaction furnace having a box structure for receiving a substrate, the reaction furnace providing a space for forming the carbon nanotube on the substrate;
    a gas inlet having a through-hole structure formed at a first portion of the reaction chamber, the gas inlet providing a passage for an inflow of a source gas for forming the carbon nanotube into the reaction chamber;
    a gas outlet having a through-hole structure formed at a second portion of the reaction chamber, the gas outlet providing a passage for an outflow of the source gas from the reaction chamber; and
    a heat transfer member having at least one rectangular through-hole structure formed at a third portion of the reaction chamber along a direction substantially in parallel to the substrate, the heat transfer member providing a passage for transferring a heat to heat up the reaction chamber.

2. The reaction chamber of claim 1, wherein the reaction furnace comprises quartz, graphite or a mixture of quartz and graphite.

3. The reaction chamber of claim 1, wherein the reaction furnace has a rectangular box structure that has a minor axis substantially perpendicular to the substrate, and a major axis substantially in parallel to the substrate and substantially longer than the minor axis.

4. The reaction chamber of claim 1, wherein the gas inlet and the gas outlet are opposite to each other.

5. The reaction chamber of claim 1, wherein the heat transfer member comprises a plurality of through-hole structures formed at portions of the reaction furnace facing with a front face and a rear face of the substrate loaded in the reaction furnace.

6. The reaction chamber of claim 1, further comprising a pressure control passage having a through-hole structure formed at a fourth portion of the reaction furnace, the pressure control passage providing a passage for adjusting a pressure of the reaction furnace.

7. The reaction chamber of claim 1, further comprising an opening and closing member having a door structure, a shutter structure or a sliding structure provided at a lateral portion of the reaction chamber, and the substrate is loaded/unloaded into/from the reaction furnace through the opening and closing member.

8. An apparatus for manufacturing a carbon nanotube, comprising:
    a reaction chamber comprising a reaction furnace having a box structure for receiving a substrate wherein the reaction furnace provides a space for forming the carbon nanotube on the substrate; a gas inlet having a through-hole structure formed at a first portion of the reaction furnace wherein the gas inlet provides a passage for an inflow of a source gas for forming the carbon nanotube into the reaction furnace; a gas outlet having a through-hole structure formed at a second portion of the reaction furnace wherein the gas outlet provides a passage for an outflow of the source gas from the reaction furnace; and a heat transfer member having at least one rectangular through-hole structure formed at a third portion of the reaction furnace along a direction substantially in parallel to the substrate wherein the heat transfer member provides a passage for transferring a heat to heat up the reaction furnace;

a gas supply member connected to the gas inlet to provide the source gas into the reaction furnace through the gas inlet;

a gas exhausting member connected to the gas outlet to exhaust the source gas from the reaction furnace through the gas outlet; and a heating member facing with the heat transfer member to heat the reaction furnace by providing the heat into the reaction furnace through the heat transfer member.

9. The apparatus for manufacturing the carbon nanotube of claim 8, wherein the reaction furnace comprises quartz, graphite or a mixture of quartz and graphite, and wherein the reaction furnace has a rectangular box structure that has a minor axis substantially perpendicular to the substrate, and a major axis substantially in parallel to the substrate and substantially longer than the minor axis.

10. The apparatus for manufacturing the carbon nanotube of claim 8, wherein the gas inlet and the gas outlet are opposite to each other, and the heat transfer member comprises a plurality of through-hole structures formed at portions of the reaction furnace facing with a front face and a rear face of the substrate loaded in the reaction furnace.

11. The apparatus for manufacturing the carbon nanotube of claim 8, further comprising:

a pressure control passage having a through-hole structure formed at a fourth portion of the reaction furnace wherein the pressure control passage provides a passage for adjusting a pressure of the reaction furnace; and a pressure control member connected to the pressure control passage to adjust the pressure of the reaction chamber through the pressure control passage.

12. The apparatus for manufacturing the carbon nanotube of claim 8, wherein the reaction furnace comprises an opening and closing member having a door structure, a shutter structure or a sliding structure provided at a lateral portion of the reaction chamber, and the substrate is loaded/unloaded into/from the reaction furnace through the opening and closing member.

13. The apparatus for manufacturing the carbon nanotube of claim 8, wherein the heating member comprises:

a lamp;

a reflection plate for reflecting a heat generated from the lamp toward the heat transfer member; and a heating plate covering the heat transfer member to sufficiently transferring the heat generated from the lamp toward the heat transfer member.

14. The apparatus for manufacturing the carbon nanotube of claim 13, wherein the lamp comprises a halogen lamp or an infrared lamp.

15. The apparatus for manufacturing the carbon nanotube of claim 13, wherein the heating plate comprises quartz, graphite or a mixture of quartz and graphite, and the apparatus further comprises a sealing member for sealing a peripheral portion of the heating plate sufficiently covering the heat transfer member.

16. The apparatus for manufacturing the carbon nanotube of claim 8, wherein the apparatus comprises at least two stacked reaction chambers.

17. The apparatus for manufacturing the carbon nanotube of claim 8, further comprising a boat installed in the reaction furnace of the reaction chamber wherein the substrate is loaded on the boat.

18. The apparatus for manufacturing the carbon nanotube of claim 8, further comprising heat conversing members opposite to each other disposed at inner lateral portions of the reaction furnace of the reaction chamber wherein each of the heat conversing members concentrates a heat transferred into the reaction chamber toward a center of the reaction chamber.

19. The apparatus for manufacturing the carbon nanotube of claim 8, wherein the gas supply member comprises a shower head having a plurality of spraying holes disposed toward the gas inlet.

20. A system for manufacturing a carbon nanotube, comprising:

an apparatus for manufacturing the carbon nanotube comprising:

a reaction chamber comprising a reaction furnace having a box structure for receiving a substrate wherein the reaction furnace provides a space for forming the carbon nanotube on the substrate; a gas inlet having a through-hole structure formed at a first portion of the reaction furnace wherein the gas inlet provides a passage for an inflow of a source gas for forming the carbon nanotube into the reaction furnace; a gas outlet having a through-hole structure formed at a second portion of the reaction furnace wherein the gas outlet provides a passage for an outflow of the source gas from the reaction furnace; and a heat transfer member having at least one rectangular through-hole structure formed at a third portion of the reaction furnace along a direction substantially in parallel to the substrate wherein the heat transfer member provides a passage for transferring a heat to heat up the reaction furnace;

a gas supply member connected to the gas inlet to provide the source gas into the reaction furnace through the gas inlet;

a gas exhausting member connected to the gas outlet to exhaust the source gas from the reaction furnace through the gas outlet; and a heating member facing with the heat transfer member to heat the reaction furnace by providing the heat into the reaction furnace through the heat transfer member; and a transfer apparatus coupled to the apparatus to load/unload the substrate into/from the reaction furnace.

21. The system for manufacturing the carbon nanotube of claim 20, further comprising a gate valve installed between the apparatus for manufacturing the carbon nanotube and the transfer apparatus wherein the transfer apparatus and the apparatus for manufacturing the carbon nanotube are connected to each other by opening the gate valve.

22. The system for manufacturing the carbon nanotube of claim 20, further comprising a pressure control passage having a through-hole structure formed at a fourth portion of the reaction furnace wherein the pressure control passage provides a passage for adjusting a pressure of the reaction furnace, and a pressure control member connected to the pressure control passage to adjust the pressure of the reaction chamber through the pressure control passage.

23. The system for manufacturing the carbon nanotube of claim 20, wherein the reaction furnace comprises an opening and closing member having a door structure, a shutter structure or a sliding structure provided at a lateral portion of the reaction chamber toward the transfer apparatus, and the substrate is loaded/unloaded into/from the reaction furnace through the opening and closing member.

24. The system for manufacturing the carbon nanotube of claim 20, wherein the heating member comprises:

a heat source including a halogen lamp or an infrared lamp;
a reflection plate for reflecting a heat generated from the heat source toward the heat transfer member; and
a heating plate covering the heat transfer member to sufficiently transferring the heat generated from the heat source toward the heat transfer member.

25. The system for manufacturing the carbon nanotube of claim 20, further comprising a boat installed in the reaction furnace of the reaction chamber wherein the substrate is loaded on the boat.

26. The system for manufacturing the carbon nanotube of claim 20, further comprising heat conversing members opposite to each other disposed at inner lateral portions of the reaction furnace of the reaction chamber wherein each of the heat conversing members concentrates a heat transferred in the reaction chamber toward a center of the reaction chamber.

* * * * *